Patented Aug. 18, 1931

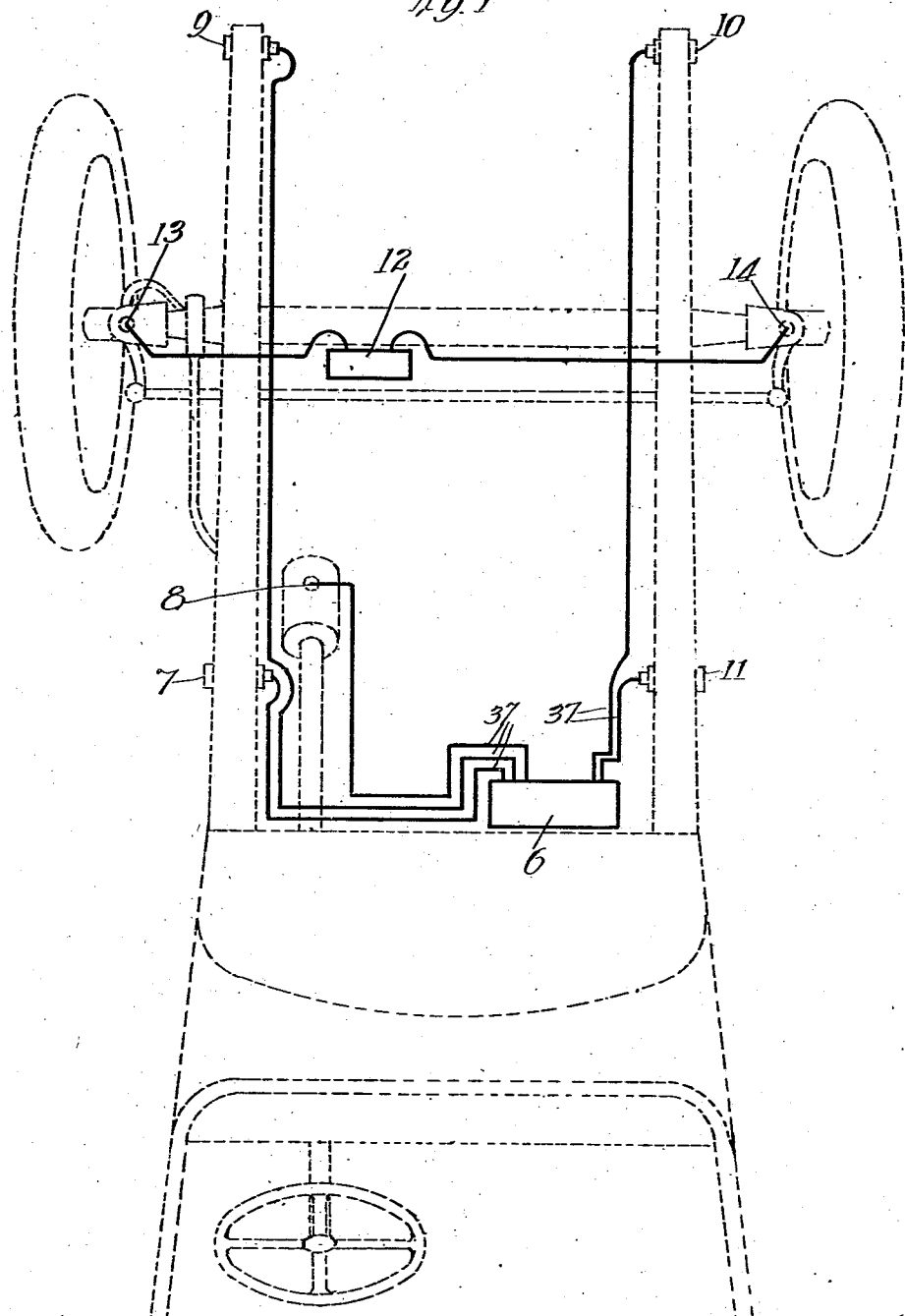

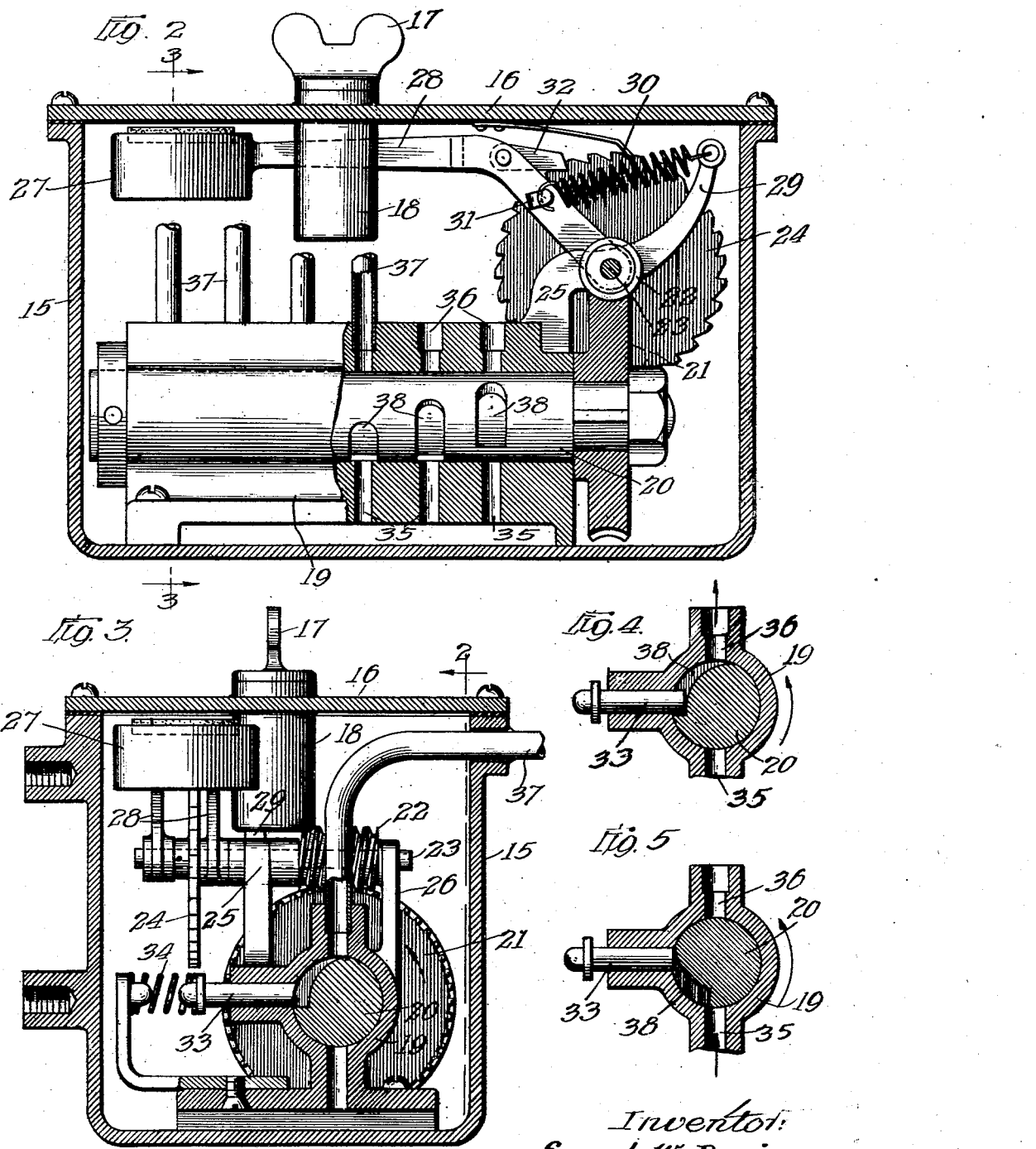

1,819,359

UNITED STATES PATENT OFFICE

ERNEST W. DAVIS, OF OAK PARK, ILLINOIS, ASSIGNOR, BY MESNE ASSIGNMENTS, TO ALEMITE CORPORATION, OF CHICAGO, ILLINOIS, A CORPORATION OF DELAWARE

LUBRICATING SYSTEM AND LUBRICATOR THEREFOR

Application filed March 9, 1925. Serial No. 14,316.

My invention relates to lubricating systems adapted for use on moving machines, such as motor vehicles. One object of my invention is to provide a lubricating system of the centralized type, which obviates the necessity of flexible conduits between the parts which move with the frame of the vehicle, and the parts which move relative thereto.

My invention also relates to the lubricator itself, and has for its object in this respect the provision of an automatic lubricator provided with means whereby movements of the vehicle acting on an inertia member, supply energy for operating one or more pumps arranged for supplying lubricant to the bearings to be lubricated. A more specific object is to provide means whereby the energy supplied by the moving vehicle is stored up gradually and released suddenly. The gradual accumulation and sudden release of energy, combined with the inertia operated pumps, produces a very desirable combination, the advantages of which will be described hereinafter.

A further object of my invention, is to produce a positive acting, multiple pump, in which a single moving part opens and closes the inlet and outlet ports of all the pumps, and also serves to operate the pump plungers.

The lubricator of this invention comprises an oil receptacle adapted to supply oil to a plurality of pumps, and an inertia member, adapted to operate the pumps and arranged to receive energy from the movements of the vehicle to which the lubricator is attached. The inertia member comprises a weight, supported by a spring, the tension of which normally balances the weight, so that movement of the vehicle will cause movement of the weight, relative to the oil receptacle, due to the inertia of the weight. This movement of the weight is converted to rotary motion by means of a pawl and ratchet mechanism, and the rotary motion is transmitted to a cam shaft arranged to move a plurality of spring-actuated pump plungers. The cams on the cam shaft are so shaped that energy is stored gradually in the plunger springs and then released suddenly.

In order to obviate the necessity of using flexible conduits between the sprung and unsprung parts of the vehicle, two or more lubricators are attached to the vehicle; one at least, being located on the frame or some part movable therewith, and one or more on the axles.

In the drawings, Fig. 1 is a somewhat diagrammatic representation of a motor vehicle showing the installation of two lubricators; one on the front axle and one on the dashboard. The lubricators and conduits are shown in full lines, to differentiate between the parts of the vehicle shown in dotted lines and the parts of the lubricating system. A limited number of conduits are illustrated in order to avoid confusion.

Fig. 2 is a longitudinal section of the lubricator proper, the section being taken on the line 2, 2, in Fig 3.

Fig. 3 is a transverse section on the line 3, 3 in Fig. 2.

Figs. 4 and 5 are transverse sections of one of the pumps with the cam shaft in different positions.

Referring to Fig. 1, the lubricator 6 is fastened to the dash-board of the vehicle, and is arranged to lubricate the bearings 7, 8, 9, 10, and 11. All these bearings, as well as the lubricator 6, are stationary relative to the frame of the vehicle so that no flexible conduits are required to carry oil from the lubricator to these bearings.

The lubricator 12, is fastened to the front axle and is arranged to lubricate the bearings 13 and 14, both of which are stationary relative to the axle on which the lubricator 12 is fastened.

In prior lubricating systems of the centralized type, it has been the practice to carry oil to the bearings 13 and 14 by means of a flexible conduit, which, due to the mechanical abuse occasioned by the movement of the axle, soon becomes leaky. In the improved system, no flexible conduit is required, as the bearings of each movable unit are lubricated by a lubricator attached to the same unit.

Referring to Fig. 2, the oil receptacle 15 is provided with a cover 16, having a filling plug 17, and a filling tube 18, which limits the amount of oil that can be poured into the lubricator. Secured to the bottom of the oil receptacle is a pump body 19, which is accurately reamed to receive a rotatable cam shaft 20. Secured to one end of the cam shaft 20, is a worm gear 21, which is driven by the worm 22, which is secured to the worm shaft 23. A ratchet wheel 24, is likewise secured to the worm shaft 23, which rotates in the bearings 25 and 26, integral with the body 19.

The inertia weight 27 is integral with the lever 28, which is pivoted on the worm shaft 23. The arm 29 is integral with the bearing 25 and with the body 19, and carries one end of a spring 30, which connects with the hook 31 on the lever 28. The spring 30 is tensioned to balance the inertia weight 27. A pawl 32 is pivoted on the lever 28, and engages the teeth of the ratchet wheel 24.

The body 19 is bored to receive a horizontal row of plungers 33, only one of which is shown (see Fig. 3). Each plunger is urged towards the body 19 by a spring 34. Drilled in the body 19, in line with each plunger, is an inlet port 35, and an outlet port 36. Each outlet port is provided with a conduit 37, which leads to one of the bearings to be lubricated. The cam shaft 20 is provided with cam shaped pockets 38, each of which is in line with a plunger 33.

The operation of this lubricator is as follows: The inertia weight 27, due to the movements of the vehicle and its own inertia, is caused to move with oscillating motion. The oscillating motion is converted into intermittent rotary motion by means of the pawl 32 and the ratchet wheel 24. The torque of the rotary motion is increased and its speed decreased by means of the worm 22 and the worm gear 21, thereby giving a slow rotary motion to the cam shaft 20, in the direction indicated by the arrows.

If a cam pocket is in the position shown in Fig. 3, a slight rotation in the direction indicated by the arrow will allow the plunger 33 to enter the cam pocket as shown in Fig. 4, thereby displacing a certain volume of oil (assuming that the pocket is filled with oil) and discharging the oil out through the conduit 37. Continued rotation of the cam shaft restores the plunger to its original position and opens the inlet port 35, as shown in Fig. 5. A volume of oil equal to that displaced is then drawn into the cam pocket, as will be readily understood.

The rotation of the cam shaft is necessarily very slow, so that the outward movement of the plunger is also very slow. If the plunger moved inward only as fast as its outward movement, the pumping action would be very uncertain, due to leakage around the plunger. But in the construction shown, the inward movement is rapid regardless of the speed of the cam shaft 20. This is a valuable feature and quite essential to the successful operation of the lubricator.

I claim:

1. A lubricator comprising an oil receptacle, a filling tube projecting downwardly into said oil receptacle, whereby a maximum oil level is established in said oil receptacle, an inertia weight above said maximum oil level, a spring above said maximum oil level and tensioned to balance said inertia weight, a pawl and ratchet mechanism actuated by movement of said inertia weight, a worm gear operated by said pawl and ratchet mechanism, a cam shaft driven by said worm gear, a plurality of cams on said cam shaft, and a plurality of pump plungers, each of said plungers being operated by one of said cams.

2. A lubricator comprising an oil reservoir, an oscillating inertia weight pivotally mounted in said reservoir, a spring yieldingly supporting said inertia weight, means for converting the oscillating motion of said inertia weight into rotary motion, a pump having an inlet and an outlet port, integral means rotated by said last-named means for actuating said pump in one direction and for opening and closing said inlet and outlet ports and spring means for actuating said plunger in an opposite direction.

3. A unitary lubricant supply device comprising an oil reservoir, an oscillatory inertia weight mounted within said reservoir, a spring yieldingly supporting said inertia weight, mechanical means for converting oscillatory motion of said inertia weight into rotary motion, a plurality of pumps each having an inlet port and an outlet port and located in the lower portion of said reservoir, and integral means operated by said mechanical means for charging said pumps and for opening and closing the inlet and outlet ports thereof.

4. A lubricator comprising an oil receptacle, a pump disposed within said receptacle having a chamber therein and adapted to receive oil from said receptacle, a plunger for said pump, a spring for moving said plunger in one direction, an inertia weight mounted within the upper portion of said receptacle, a cam having a gradual rise and sudden fall adapted to actuate said plunger against the force of said spring, and means for rotating said cam, said means being operated by said inertia weight.

5. A lubricator comprising an oil receptacle, a pump located within said receptacle and adapted to receive oil therefrom, an inertia weight, means for slowly charging said pump, means for suddenly discharging said pump, and means operable by a plurality of movements of said inertia weight to actuate said charging and discharging means.

6. A lubricator comprising an oil receptacle, a pump mounted within said receptacle and having an inlet port adjacent the bottom thereof, an inertia weight pivotally mounted within said receptacle near the top thereof, means for storing up the energy from a plurality of movements of said inertia weight and for simultaneously charging said pump, means for suddenly releasing the stored energy to discharge said pump, and an operative connection between said inertia weight and said charging and discharging means.

In testimony whereof I hereunto affix my signature.

ERNEST W. DAVIS.